June 16, 1942.   M. KATCHER   2,286,422
BALL BEARING
Filed Aug. 24, 1940
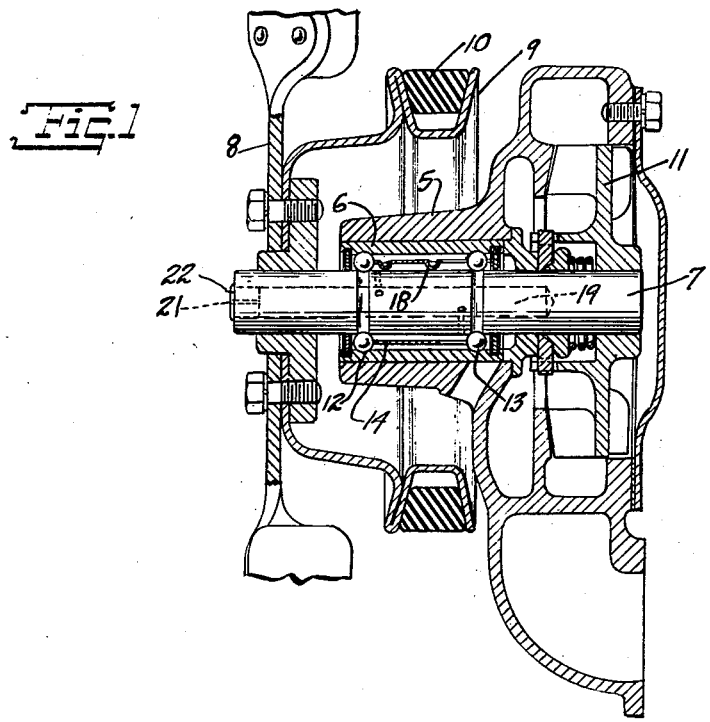
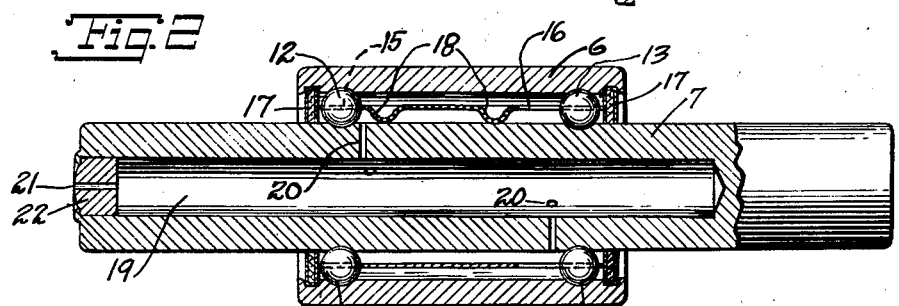
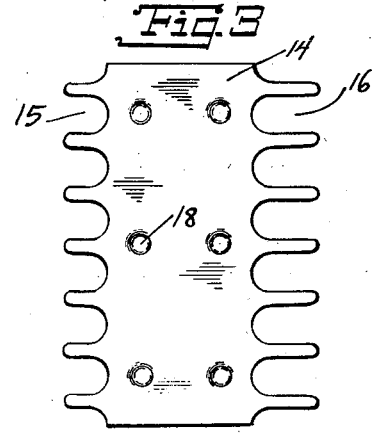
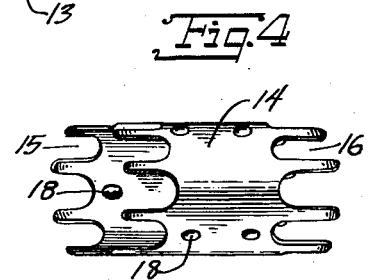
INVENTOR
*Morris Katcher*
BY
*Emanuel Scheyer*
ATTORNEY Patented June 16, 1942

2,286,422

UNITED STATES PATENT OFFICE 2,286,422

BALL BEARING

Morris Katcher, New York, N. Y.

Application August 24, 1940, Serial No. 354,030

6 Claims. (Cl. 308—201)

This invention relates to a ball bearing having two spaced rows of balls. A bearing of this type will hold one of its races with considerable leverage against turning about an axis perpendicular to the axis of rotation when the other of its races is supported against such turning. The particular embodiment of the invention illustrated shows the bearing as part of an automobile water pump and fan in which the pump and fan shaft serves as the inner race. Of course it will be understood that the inner race is not necessarily a shaft but may assume other forms. Another object of the present invention is to provide a lubricant reservoir in the inner race with small feed passages leading lubricant from the reservoir to the space between the races. A vent is provided for the reservoir to prevent the formation of a vacuum therein as the lubricant leaves it. A vacuum would tend to hold back the lubricant from passing out the feed passages.

Other objects and advantages will become apparent upon further study of the description and drawing, in which:

Fig. 1 is a longitudinal section of the ball bearing showing it as part of an automobile water pump and fan unit, only a portion of the fan being shown.

Fig. 2 is a longitudinal section to an enlarged scale through the bearing and water pump and fan shaft by themselves.

Fig. 3 is a development of the sheet metal shell used to form the retainer cage, and Fig. 4 is a perspective view of the retainer cage shown by itself.

The outer race 6 of the bearing is fixed to the body 5 of the water pump. The pump shaft 7 is in effect the inner race. Fan 8 is fixed to shaft 7. Pulley wheel 9 is fixed to fan 8 and is driven by belt 10. Impeller 11 and fan 8 are fixed to shaft 7. There are two spaced rows of balls, row of balls 12 and row of balls 13, between outer race 6 and inner race or shaft 7. Each row runs in a pair of opposing grooves forming a raceway, one groove of a pair being in outer race 6 and the other in shaft 7. Retainer cage 14 holds the balls in spaced relation by means of notches 15 and 16 at its ends. Balls 13 are set in notches 16 which are deeper than notches 15 in which balls 12 are set. It is to be noted that balls 13 are at the outer end of notches 16 for a reason which will be explained later. In order to maintain cage 14 concentric with shaft 7, teats 18 are pressed in from cage 14. The ends of the space between the races are closed by washers 17 which are held in outer race 6, the ends of the latter being peened over. Said washers have a running fit on shaft 7. The length of cage 14 is just slightly less than the distance between the washers 17 at opposite ends of the bearing. This enables the washers to maintain cage 14 in the axial position shown for it in Fig. 2.

The space between the races is filled with lubricant before washers 17 at one end are fastened in place. The washers 17 each comprise two thin metal washers with a leather or felt washer between them. In order to provide additional lubrication, enough substantially for the life of the bearing, shaft 7 is hollowed out to form a reservoir 19. Grease feed passages 20 are provided leading from reservoir 19 to the space between the bearings. The grease or lubricant used is one which is fairly stiff at ordinary temperatures. When the bearing runs for a while it gets warmed up softening the grease which under the action of centrifugal force tends to cause the lubricant to pass out from reservoir 19 through passages 20 into the space between the races. To enable the lubricant to leave reservoir 19 without being held back by the formation of a vacuum therein, vent hole 21 is provided at the axis of rotation in plug 22. Because it is at the axis of rotation, no centrifugal force will force grease out hole 21. Plug 22 has a forced fit in the end of shaft 7. For related construction see my Patents Nos. 2,217,801; 2,219,321 and 2,235,431.

In assembling the bearing, balls 13 are first inserted between the races, outer race 6 being held eccentric at its right end with respect to shaft 7 to enable the balls to get into the oppositely disposed grooves in the races near the right end of the bearing. At first the balls are crowded in together in the wide part of the temporary eccentric space produced between the races. Cage 14 is then inserted between the races from their left being moved to the right when balls 13 are moved circumferentially so that they become properly spaced to fit into deep notches 16. Cage 14 is then moved to the right so that balls 13 are all the way in notches 16 instead of being at their outer end as seen in Fig. 2. The left hand end of the races are then moved into eccentric relation, straining the parts of the bearing to do it. Balls 12 are then crowded in together in the wide part of the temporary eccentric space between the bearings. Cage 14 is moved to the left, when balls 12 are moved circumferentially so that they become properly spaced to fit into shallow notches 15. This latter movement of cage 14 will bring balls 13 at the outer end of notches 16, which is the position shown for them in Fig.

2. Cage 14 is maintained in this position by washers 17 when they are fastened in place. Notches 16 must be sufficiently deep to enable cage 14 to be moved far enough to the right to clear balls 12 so that the latter may be inserted into the race grooves while the bearings are held eccentric.

While oppositely disposed grooves are preferred for the raceway at each end of the bearing, it would be sufficient to have a groove forming the raceway either in the outer race or in the inner race or shaft at each end of the bearing. With only one groove, less straining of the parts will be required to assemble balls 12.

I claim:

1. In a ball bearing, two rolls of balls, said rows being set in substantial axially spaced relation, an outer race and an inner race between which the balls are mounted for rolling in said spaced relation, and a retainer cage having axially extending notches at each axial end, said balls being set in the notches when assembled, a row at each end, the notches at one end being sufficiently deep to enable them during assembling of the bearing to hold the balls at said one end within them while the cage is moved toward the balls at said one end sufficiently to have the balls at the other end clear the notches at said other end when said latter balls are set in their predetermined axial position.

2. A ball bearing comprising two rows of balls, said rows being in substantial axially spaced relation, an outer race and an inner race between which the balls are mounted for rolling, a substantially cylindrical retainer cage having notches at the ends, the balls being set in the notches, a row at each end, the notches at one end being substantially deeper than the diameter of the balls set in them, and means attached to one of the races adjacent said latter end of the cage for preventing axial shifting of the cage toward said latter end.

3. A ball bearing comprising two rows of balls, said rows being set in substantial axially spaced relation, an outer race and an inner race between which the balls are mounted for rolling in said spaced relation, a retainer cage having axially extending notches at each axial end, the balls being set in the notches when assembled, a row at each end, the notches at one end being sufficiently deep to enable the cage during assembling of the bearing to be shifted axially to clear the balls at the other end, and means extending between the races for preventing axial movement of the cage after both rows of balls are assembled in the notches.

4. A ball bearing comprising an inner and an outer race, two rows of balls mounted between the races, two raceways being provided, one near each end of the bearing, in which the two rows of balls roll, a retainer cage having axially extending notches at each axial end for holding the balls in spaced relation circumferentially in the raceways the notches at one end being substantially deeper than the diameter of the balls set in them, and means extending between the races for sealing off the space between the races to retain lubricant inserted therein, said means at said latter end also preventing axial movement of the cage toward said latter end.

5. A ball bearing comprising an inner and an outer race, two rows of balls mounted between the races, two raceways being provided, one near each end of the bearing in which the two rows of balls roll, said raceways comprising at least one groove near each end of the bearing in either one of the races, a retainer cage having axially extending notches at each axial end, said balls being set in the notches when assembled, a row at each end, the notches at one end being sufficiently deep to enable the cage during assembling of the bearing to contain the balls in the raceway at said one end when shifted axially and clear the balls in the raceway at the other end, and means extending between the races for preventing axial movement of the cage after both rows of balls are assembled in the notches.

6. A ball bearing comprising an inner race and an outer race, two rows of balls mounted between the races, two raceways being provided, one near each end of the bearing, in which the two rows of balls roll, a retainer cage having axially extending notches at each axial end, said balls being set in the notches when assembled, a row at each end, the notches at one end being deeper than the notches at the other end and sufficiently deep to enable the cage during assembling of the bearing to contain the balls in the raceway at said one end when shifted axially and clear the balls in the raceway at the other end, and means in between the races for preventing axial movement of the cage after both rows of balls are assembled in the notches.

MORRIS KATCHER.